United States Patent
Kurth et al.

(10) Patent No.: US 9,322,475 B2
(45) Date of Patent: Apr. 26, 2016

(54) FRICTIONLESS SHAFT SEAL

(75) Inventors: Jürgen Kurth, Odenthal (DE); Jürgen Netzer, Burscheid (DE); Wolfgang Irmen, Langenfeld (DE); Willy Seewald, Remscheid (DE)

(73) Assignee: AB SKF, Gothenburg (SE)

( * ) Notice: Subject to any disclaimer, the term of this patent is extended or adjusted under 35 U.S.C. 154(b) by 639 days.

(21) Appl. No.: 11/806,639

(22) Filed: Jun. 1, 2007

(65) Prior Publication Data

US 2007/0296153 A1 Dec. 27, 2007

(30) Foreign Application Priority Data

Jun. 2, 2006 (DE) .......................... 10 2006 025 799

(51) Int. Cl.
*F16J 15/32* (2006.01)

(52) U.S. Cl.
CPC .......... *F16J 15/3232* (2013.01); *F16J 15/3244* (2013.01)

(58) Field of Classification Search
CPC ....... F16J 15/32; F16J 15/3204; F16J 15/324; F16J 15/3244
USPC .......................................... 277/549, 551, 559
See application file for complete search history.

(56) References Cited

U.S. PATENT DOCUMENTS

| | | | | |
|---|---|---|---|---|
| 4,094,519 A * | 6/1978 | Heyn et al. | | 277/559 |
| 4,497,496 A * | 2/1985 | Repella | | 277/559 |
| 4,746,128 A * | 5/1988 | Freiwald | | 277/349 |
| 5,860,656 A * | 1/1999 | Obata et al. | | 277/559 |
| 6,168,164 B1 * | 1/2001 | Toth et al. | | 277/559 |
| 6,715,768 B1 * | 4/2004 | Bock et al. | | 277/559 |
| 6,921,080 B2 * | 7/2005 | Johnen | | 277/549 |
| 2004/0056427 A1 * | 3/2004 | Rapp et al. | | 277/549 |
| 2004/0188950 A1 * | 9/2004 | Guillerme et al. | | 277/549 |
| 2004/0227304 A1 * | 11/2004 | Kern et al. | | 277/559 |
| 2005/0242521 A1 * | 11/2005 | Bock et al. | | 277/559 |

FOREIGN PATENT DOCUMENTS

DE 3830708 A1 * 3/1990 ............ F16J 15/32

* cited by examiner

*Primary Examiner* — Gilbert Lee

(74) *Attorney, Agent, or Firm* — Buchanan Ingersoll & Rooney PC

(57) ABSTRACT

A sealing element for sealing a shaft comprises a stiffening part, a first elastomer part connected to the stiffening part and adapted to adjoin the housing part and provide a static seal relative, and a second elastomer part of an elastomer material different from the elastomer material forming the first elastomer part. The second elastomer part is connected to the stiffening part and comprises a sealing section adapted to adjoin the shaft to seal a space. The sealing section comprises a return structure for returning a leaking fluid to a space to be sealed. The sealing section also comprises a region at one axial end portion of the sealing section which is peripherally closed in itself and extends along an inner surface of a circular cylinder portion of the sealing section that is adapted to adjoin and seal the shaft as the shaft is not turning.

18 Claims, 3 Drawing Sheets

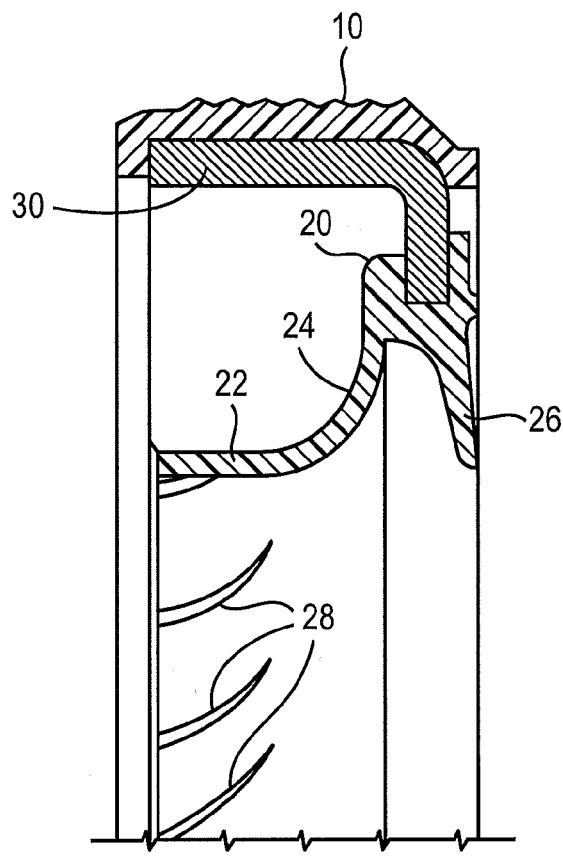
FIG. 1
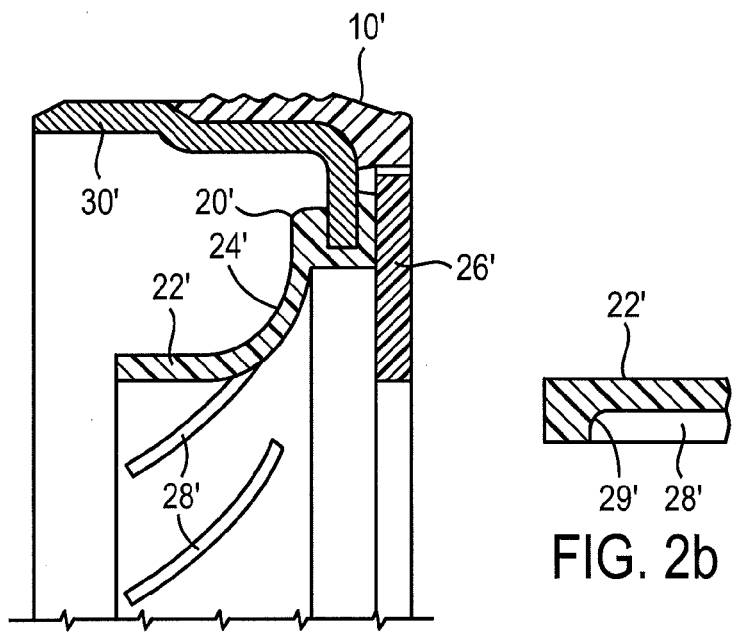
FIG. 2a
FIG. 2b ized by the shaft are reduced into the region of the PTFE grain size and the sliding properties of the PTFE which are good anyway are partially promoted by fillers such as graphite or molybdenum disulfide. The seal configuration optimized for the indicated application requires special care during installation to avoid damage to the PTFE sealing lip material which is relatively inelastic compared to fluoropolymer seals. Furthermore, to detect proper positioning of the shaft seal, the shaft seal after its installation is more and more often subjected to automated pressure and/or vacuum testing on the assembly line of the internal combustion engine or of the transmission. Due to the low elasticity of the PTFE sealing lip, its low specific contact force with the shaft, the structure of the shaft contact surface which is amorphous due to its glass fiber fillers, and its helical oil return structure which is open to the atmosphere, its contact region to the shaft cannot be adequately sealed in a gas-tight manner without additional conditioners. For this reason, during the indicated pressure and/or vacuum testing, the sealing gap must be temporarily sealed, for example by using a wax which is volatile with respect to the operation of the transmission or the internal combustion engine. In such a case, a faulty wax application process or installation-induced damage of the wax layer during the indicated pressure and/or vacuum testing can lead to an apparent leak. This undesirably leads to rejection of the actually serviceable shaft seal and thus of the transmission or internal combustion engine.

FRICTIONLESS SHAFT SEAL

TECHNICAL FIELD

The disclosed subject matter generally relates to a sealing element. More particularly, the subject matter involves a frictionless shaft seal for sealing a shaft which is intended to rotate on a passage opening of a housing part for the shaft.

BACKGROUND DISCUSSION

Particularly in the case of internal combustion engines and transmissions in the automotive area, special requirements with respect to service life, friction and installation reliability are imposed on the shaft seals used in such environments. Radial shaft gaskets with sealing lips of chemically highly resistance polytetrafluorethylene (PTFE) and a helical conveyor structure, for example for a synthetic oil of an internal combustion engine, are known. In this connection, to reduce friction, the lip cross sections widened by the shaft are reduced into the region of the PTFE grain size and the sliding properties of the PTFE which are good anyway are partially promoted by fillers such as graphite or molybdenum disulfide. The seal configuration optimized for the indicated application requires special care during installation to avoid damage to the PTFE sealing lip material which is relatively inelastic compared to fluoropolymer seals. Furthermore, to detect proper positioning of the shaft seal, the shaft seal after its installation is more and more often subjected to automated pressure and/or vacuum testing on the assembly line of the internal combustion engine or of the transmission. Due to the low elasticity of the PTFE sealing lip, its low specific contact force with the shaft, the structure of the shaft contact surface which is amorphous due to its glass fiber fillers, and its helical oil return structure which is open to the atmosphere, its contact region to the shaft cannot be adequately sealed in a gas-tight manner without additional conditioners. For this reason, during the indicated pressure and/or vacuum testing, the sealing gap must be temporarily sealed, for example by using a wax which is volatile with respect to the operation of the transmission or the internal combustion engine. In such a case, a faulty wax application process or installation-induced damage of the wax layer during the indicated pressure and/or vacuum testing can lead to an apparent leak. This undesirably leads to rejection of the actually serviceable shaft seal and thus of the transmission or internal combustion engine.

The object of this invention is therefore to devise an improved sealing element which has good sealing properties with simple and this economical producibility both in the intended operation and also for test purposes.

SUMMARY

A sealing element for sealing a shaft which is intended to rotate at a passage opening of a housing part for the shaft comprises a stiffening part, a first elastomer part adapted to adjoin the housing part and provide a static seal relative to the housing part, with the first elastomer part being made of a first elastomer material and being connected to the stiffening part, and a second elastomer part of a second elastomer material which is different from the first elastomer material, with the second elastomer part being connected to the stiffening part. The second elastomer part comprises a sealing section adapted to adjoin the shaft to provide a static seal relative to the shaft to seal a space, and the sealing section comprises return means for returning a leaking fluid to a space to be sealed. The sealing section comprises a region at one axial end portion of the sealing section which is peripherally closed in itself and extends along an inner surface of a circular cylinder portion of the sealing section that is adapted to adjoin and seal the shaft as the shaft is not turning.

The sealing element disclosed here, taking into account application-specific requirements for tightness, service life, friction and power loss, offers the possibility of automated installation and checking by a downstream gas leak test. Because the two elastomer parts are made of different elastomer materials, special matching to dynamic or static seal requirements and economical production are possible.

Also, by virtue of the second elastomer part being made of an elastomer material, the sealing section, especially relative to a comparable PTFE version, has higher elasticity from which, due to the contact capacity of the sealing section, especially the line closed in itself which runs radially in the peripheral direction on the surface of a circular cylinder, on the opposing running surface of the shaft, a defined and statically gas-tight installation is possible. From this in turn, the indicated pressure and/or vacuum testing is possible without applying additional materials to the sealing section.

Furthermore, to achieve friction power as low as possible relative to comparable known versions, the sealing element is made especially adapted by a cross section-reduced sealing section and associated with it with a low specific radial force.

In one advantageous version, the return structure for a sealing section designed to adjoin the shaft comprises at least three grooves or crosspieces which are distributed in the peripheral direction. In this connection, adaptation to the respectively required return rate and directions of rotation is advantageously possible by a host of separated grooves or crosspieces curved in the same or opposite direction and distributed around the periphery.

According to another aspect, a sealing element for sealing a shaft which is intended to rotate at a passage opening of a housing part for the shaft comprises a stiffening part, a first elastomer part adapted to adjoin the housing part and provide a static seal relative to the housing part, with the first elastomer part being made of a first elastomer material and being connected to the stiffening part, and a second elastomer part of a second elastomer material which is different from the first elastomer material, with the second elastomer part being connected to the stiffening part. The second elastomer part comprises a sealing section adapted to adjoin the shaft to provide a static seal relative to the shaft to seal a space. A plurality of grooves are provided on the inside surface of the sealing section to permit fluid return toward a space to be sealed, and the plurality of grooves are circumferentially spaced apart on the inside surface of the sealing section. Each of the grooves have one end that terminates at a region at one axial end portion of the sealing section which is peripherally closed in itself and extends along an inner surface of a circular cylinder portion of the sealing section.

BRIEF DESCRIPTION OF THE DRAWING FIGURES

Additional features and details associated with the disclosed sealing element will become more apparent from the embodiments of the sealing element described below and illustrated in the following drawing figures.

FIG. 1 is a lengthwise cross-sectional view through the top half of a sealing element according to one embodiment.

FIG. 2a is a lengthwise cross-sectional view through the top half of a sealing element according to another embodiment.

FIG. 2b is an enlarged cross-sectional view of a portion of the sealing element shown in FIG. 2a.

DETAILED DESCRIPTION

Figure 5:
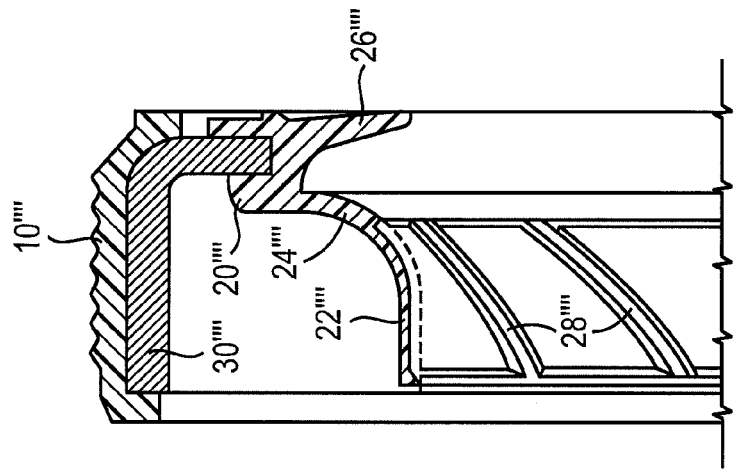
FIG. 5 is a lengthwise cross-sectional view through the top half of a sealing element according to a further embodiment.

FIG. 1 illustrates one embodiment of a sealing element as disclosed herein. The sealing element is an annular sealing element comprising a stiffening part 30, a first elastomer part 10 which is connected to the stiffening part 30, and a second elastomer part 20. The stiffening part 30 is made of, for example, sheet metal. The first elastomer part 10 is made from a first elastomer or elastomeric material, especially AEM (ethylene-acrylic elastomer), ACM ((poly)acrylate/acrylic elastomer), EVM (ethylene vinyl acetate copolymer) or silicone. The first elastomer part 10 is joined to the stiffening part 30 by, for example, vulcanizing the first elastomer part 10 onto the stiffening part 30. The outer peripheral surface of the first elastomer part 10 is preferably corrugated and is made to statically tightly adjoin a housing part in the region of the passage opening for a shaft which is to be sealed. FIG. 1 schematically illustrates the housing part (housing). It is to be recognized that the housing part is shown schematically for illustration purposes. In practice, for example, the engagement of the elastomer part 10 with the housing would cause deformation of the corrugation at the outer surface of the elastomer part 10. In the case of, for example, an internal combustion engine, an oil space of the engine exists on the left side of FIG. 1 while on the right side of FIG. 1 there is, for example, the air side of the internal combustion engine which belongs to or communicates with the ambient atmosphere.

The second elastomer part 20 is likewise attached, for example by vulcanization, to the stiffening element 30. In the disclosed embodiment, the second elastomer part 20 is made of a fluoroelastomer and can furthermore contain PTFE nano particles. With proper installation of the sealing element, a hollow cylinder-like sealing section 22 of the second elastomer part 20 adjoins and contacts the outer surface of a shaft (generally illustrated in FIG. 1). This sealing section 22 then passes or transitions smoothly, to the right side, into a section 24 which flares radially outwardly, like a trumpet. In this embodiment, the trumpet-shaped section 24, with its cross section diminishing in a direction toward the oil space, projects into the oil space. In other embodiments, the sealing element of FIG. 1 can be varied. For example, omitting the secondary sealing lip 26, the sealing element can also be attached to the stiffening part 30 in a manner mirrored by 180° relative to that shown in FIG. 1 so that the trumpet-like section or flared section 24 is arranged to widen the oil space to the air side, and in this connection the conveyor structure for a return action to the oil space can be matched accordingly if necessary. In this alternative, instead of the sealing section 22 and the flared section extending toward the left side as shown in FIG. 1, they would extend towards the right side.

A row of sickle-like grooves 28 is arranged on the inside surface of the hollow cylinder-like sealing section 22. These grooves 28 are distributed in the peripheral direction and apply a return action to the oil penetrating between the shaft and the seal section 22 when the shaft turns with the intended direction of rotation. These grooves 28 thus form a return structure or return means for returning a fluid (leaking fluid) to a space to be sealed. The return structure preferably comprises at least three grooves. The grooves 28 are configured to possess a width which becomes larger toward the oil side (i.e., toward the left as shown in FIG. 1). In the illustrated embodiment, the grooves 28 become gradually larger toward the oil side. The end of the grooves 28 closest to the oil side (i.e., the left end of each groove in FIG. 1) opens out towards the left side, therefore toward the oil space. The left end of each groove 28 thus extends up to the free end of the sealing section 22 and is open. On the right side, the grooves 28 terminate such that the end of each groove 28 in the axial direction is connected to a circular ring-like, closed-in-itself region (radially circulating region) of the sealing section 22 which is intended, at least when the shaft is not turning, to adjoin the shaft and seal it. This ring-like, closed-in-itself region of the sealing section 22, in conjunction with the material properties of the second elastomer material, form the prerequisite for the sealing element to adjoin the shaft in a gas-tight manner when the shaft is not turning so that, to monitor correct installation of the sealing element and the sealing action (e.g., closeness test) of the internal combustion engine within the framework of its installation process without having to apply other materials between the sealing section 22 and the shaft, it can undergo pressure and/or vacuum testing. Finally the second elastomer part 20 is made to form a secondary sealing lip 26 toward the air side as seen in FIG. 1. The secondary sealing lip 26 is made from a nonwoven material. Also, in this embodiment, the secondary sealing lip 26 is integrally formed in one piece as a part of the second elastomer part.

Figure 7:
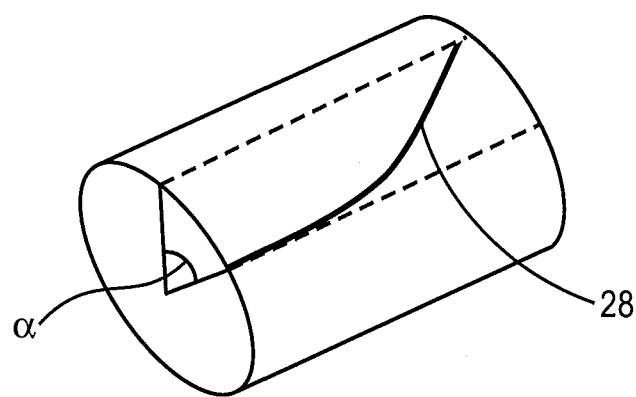
FIG. 7 is a schematic illustration of a groove showing the peripheral angle of the groove.

The grooves can be arranged so that one or more of the grooves extends in a segment of the sealing section and has a peripheral angle or circumferential angle of less than or equal to 120°. This peripheral or circumferential angle a is schematically illustrated in FIG. 7.

FIG. 2a shows another embodiment of the sealing element, once again illustrating a lengthwise cross-section through the top half of the sealing element. The sealing element of this second embodiment shown in FIG. 2a differs from the sealing element of the first embodiment shown in FIG. 1 essentially by the following points.

In the sealing element shown in FIG. 2a, the first elastomer part 10' does not completely surround the outside surface of the stiffening part 30' so that a portion of both the stiffening element 30' and the first elastomer part 10' make contact with the housing part in the proper manner.

The second elastomer part 20' of FIG. 2a differs from that of FIG. 1 in that, instead of sickle-like grooves 28, arc-like grooves 28' with a uniform cross sectional profile are present on the inside surface of the sealing section 22' and continue on the inside surface of the trumpet-like section 24'. Furthermore the arc-like grooves 28' end differently than the grooves 28 of the embodiment shown in FIG. 1. That is, toward the oil-side, the grooves 28' do not open at the end of the sealing section 22'. Rather, in the region 29', the grooves 28' empty or terminate in the manner of a ramp into an annular region which runs radially and peripherally on the inside surface of the sealing section 22' and which is designed to adjoin the shaft and seal it at least when the shaft is not turning. The ends of the grooves 28' closest to the oil-end side (i.e., left side in FIG. 2a) are spaced from the edge of the sealing section 22'. In contrast to the embodiment illustrated in FIG. 1, the indicated annular, closed-in-itself region is not located on the air-side end of the sealing section 22 as in the FIG. 1 version, but rather is located on the left side of FIG. 2a. That is, on the oil-side end of the sealing section 22'. The ramp like discharge of the arc-shaped grooves 28' is illustrated in more detail in FIG. 2b which illustrates, as an enlarged view, the relevant portion of the extract from FIG. 2a. The radial thickness of the indicated, circular ring-like, axial end portion/region is 0.3 to 1.0 mm, more preferably 0.4 to 0.55 mm. This radial thickness is identified by the dimension "X" in FIG. 2b. The ratio of the radial thickness of the indicated circular ring-like, radially peripheral region to the depth of the grooves 28' is preferably in the range from 5.0 to 1.65. The grooves 28' preferably possess a depth from 0.1 to 0.4 mm. The ramp shown in FIG. 2b illustrates an example of a transition from the grooves to the annular (ring-like), closed-in-itself region. The radial thickness "X" of the closed in itself region as mentioned above is equally applicable to other embodiments of the sealing element described here.

Finally, in the embodiment shown in FIG. 2a, the secondary sealing lip 26' is not made from the second elastomer material of the second elastomer part 20'. That is, the secondary sealing lip 26' is not formed as an integral one-piece part of the second elastomer part 20'. Rather, the secondary sealing lip 26' is made of a nonwoven material, with which a certain breathing activity or a filter effect can be achieved when the sealing lip 26' adjoins the shaft. Other than the differences described above, the features of the sealing element described above in connection with the FIG. 1 version apply accordingly to the embodiment of FIGS. 2a and 2b, with comparable components or features being are labeled with the same reference numbers, except with a prime (') designation added. In other variations, of course, an outside surface region of the sealing element of FIG. 2a can be made according to that of the sealing element of FIG. 1.

Figure 3:
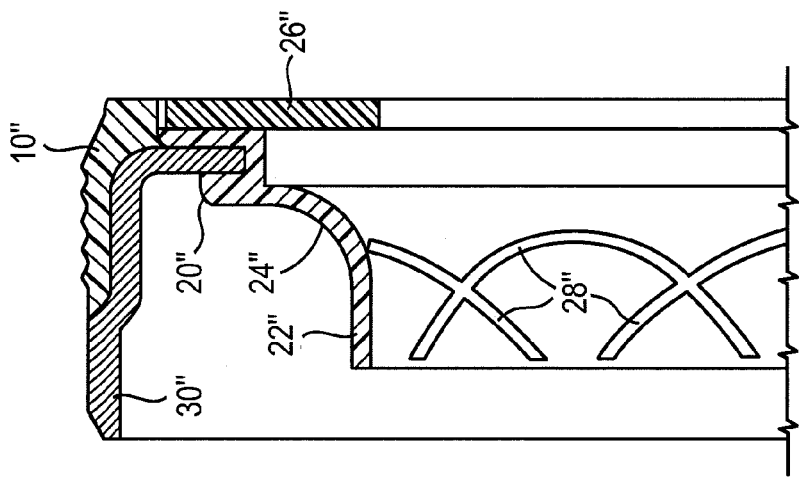
FIG. 3 is a lengthwise cross-sectional view through the top half of a sealing element according to another embodiment.

FIG. 3 is a lengthwise cross-sectional view through the top half of a sealing element according to a third embodiment. The sealing element of the third embodiment as shown in FIG. 3 differs from that of the embodiment shown in FIG. 2a in that the grooves in the FIG. 3 version are arc-shaped grooves 28" that cross one another, with the two ends of the arc-shaped grooves ending in the indicated annular region which is closed in itself. That is, the ends of the arc-shaped grooves 28" are spaced from the end or edge of the sealing section 22". In other respects, what was described above for the embodiment shows in FIGS. 2a and 2b applies also to the embodiment of FIG. 3, with comparable or corresponding features in the FIG. 3 embodiment being labeled with the same reference numbers, but with the addition of a double prime (") designation.

Figure 4:
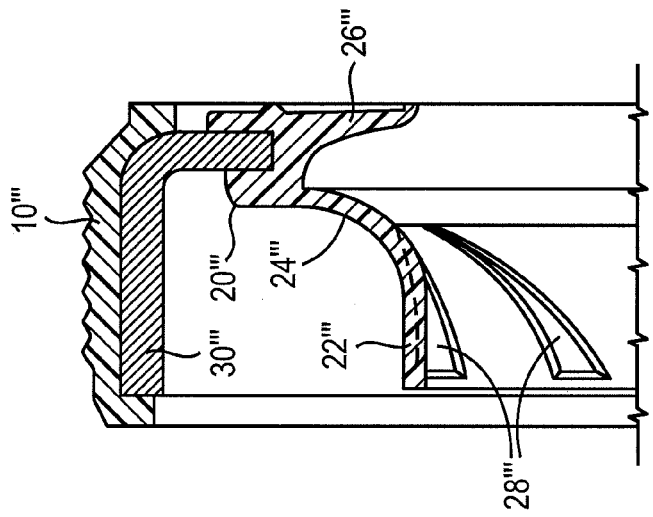
FIG. 4 is a lengthwise cross-sectional view through the top half of a sealing element according to another embodiment.

FIG. 4 depicts a still further embodiment of the sealing element. FIG. 4 once again illustrates a lengthwise cross-sectional view through the top half of the sealing element according to a fourth embodiment. The sealing element of this embodiment shown in FIG. 4 differs from the embodiment shown in FIG. 1 primarily in that the return structure for returning fluid extends on the inside surface of both the sealing section 22''' and the trumpet-like section 24'''. In addition, the annular region which is closed in itself and which is intended for sealing contact for at least a shaft which is not turning is positioned made on the left axial end of the sealing section 22''' (i.e., the oil-side end of the sealing section 22'''). The grooves 28''' in the FIG. 4 embodiment are also sickle-shaped as in the FIG. 1 embodiment, but differ from the FIG. 1 version in that they have a broader bottom. In other words, instead of being somewhat groove-shaped where the bottoms of the grooves are V-shaped or narrowly U-Shaped, the grooves can be broader at the bottom. In a manner similar to the embodiment shown in FIGS. 2a and 2b, the sickle-shaped grooves of the FIG. 4 embodiment end in a ramp-like manner in the indicated annular closed-in-itself region. In all other respects, what was described above in connection with the FIG. 1 embodiment applies equally to the embodiment of FIG. 4, with corresponding features or components being labeled with the same reference numbers, except for the addition of three primes ('").

FIG. 5 is a lengthwise cross-sectional view through the top half of a sealing element according to a fifth embodiment. The sealing element of this embodiment shown in FIG. 5 differs from that of the FIG. 4 version in that the sickle-shaped grooves 28''' in the FIG. 4 embodiment are wider or possess a greater width as illustrated by virtue of the grooves being defined between crosspieces 28''''. That is, in the FIG. 5 embodiment, the crosspieces 28''' are intended to contact the outer surface of the shaft while the regions between the crosspieces define the grooves. In all other respects, what was described above in connection with the FIG. 4 embodiment applies also to the embodiment of FIG. 5, with corresponding or comparable features being labeled with the same reference numbers, except for the use of a quadruple prime ('''') designation.

In other variations of course, combinations of the above described embodiments are possible, especially relating to the outside surface of the sealing elements and the shapes of the secondary sealing lips. Furthermore, the two elastomer parts can of course also be made touching one another on opposite sides and also passing into one another.

Figure 6:
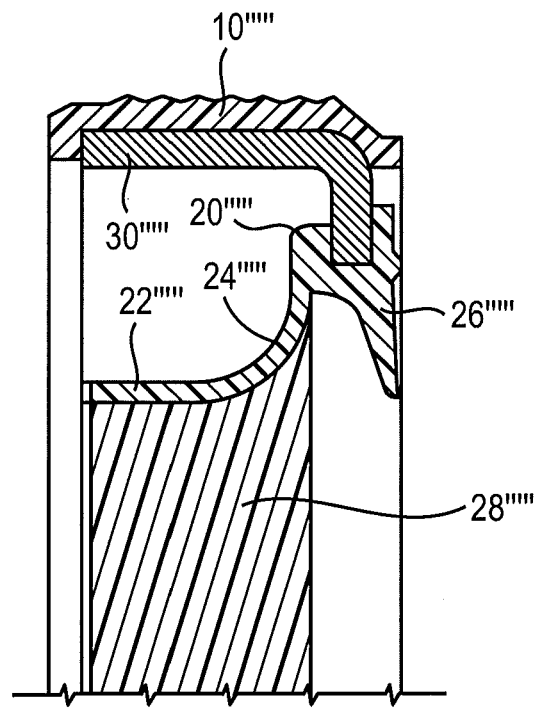
FIG. 6 is a lengthwise cross-sectional view through the top half of a sealing element according to a further embodiment.

In another variation, the return structure can also be configured as a single-thread or multiple thread screw-like groove as generally shown in FIG. 6 where the groove 28''''' is shown, with other features already described being designated with similar reference numerals, except with a five prime (''''') designation. Also, in the case of a single-thread screw-like groove, the groove can be interrupted at least at one point by a crosspiece running essentially in the axial direction so that the borders of the groove in 360° around the crosspiece site, together with the crosspiece, form the indicated region or line which is closed in itself in the peripheral direction and extends on the surface of a circular cylinder adjoining the shaft at least when it is not turning.

The principles, preferred embodiments and other disclosed aspects have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sealing element in combination with a housing part and a shaft which is rotatable at a passage opening of the housing part, the sealing element being positioned between the housing part and the shaft to seal the shaft, the sealing element comprising:

a stiffening part, a first elastomer part contacting the housing part and providing a static seal relative to the housing part;

the first elastomer part being made of a first elastomer material and being connected to the stiffening part;

a second elastomer part of a second elastomer material which is different from the first elastomer material;

the second elastomer part being connected to the stiffening part;

the second elastomer part comprising a sealing section contacting the shaft to provide a static seal relative to the shaft to seal a space to be sealed from an outside, the sealing section possessing an inside surface facing the shaft, the second elastomer part including a flared section which flares radially outwardly away from the shaft;

at least three grooves provided on the inside surface of a circular cylinder portion of the sealing section to permit fluid return toward the space to be sealed;

the at least three grooves being circumferentially spaced apart on the inside surface of the circular cylinder portion of the sealing section;

each of the at least three grooves having a first end located closer to the flared section and an opposite end farther from the flared section, the first end of each of the at least three grooves terminating at a region at one axial end portion of the circular cylinder portion of the sealing section which is peripherally closed in itself such that the first end of each of the three grooves terminates at a portion of the circular cylinder portion of the sealing section in contact with the shaft;

wherein the second elastomer part comprises a fluoroelastomer, wherein the second elastomer part comprises a secondary sealing lip arranged in contacting relationship the shaft and made of a material which provides a breathing activity or filter effect while adjoining the shaft, and wherein at least two of the grooves are arc-shaped and cross each other without connecting the space to be sealed with the outside.

2. The sealing element as claimed in claim 1, wherein the first and second elastomer parts do not directly adjoin one another.

3. The sealing element as claimed in claim 1, wherein at least one of the elastomer parts is vulcanized onto the stiffening element.

4. The sealing element as claimed in claim 1, wherein the secondary sealing lip is integrally formed in one-piece as a part of the second elastomer part.

5. The sealing element as claimed in claim 4, wherein the secondary sealing lip is made from a nonwoven material.

6. The sealing element as claimed in claim 1, wherein the stiffening part adjoins the housing part.

7. The sealing element as claimed in claim 1, wherein the one region at the one axial end portion of the circular cylinder portion of the sealing section which is peripherally closed in itself is configured as a circular ring.

8. The sealing element as claimed in claim 1, wherein the sealing element is configured such that the flared section narrows radially inwardly as it approaches the space to be sealed.

9. The sealing element as claimed in claim 1, wherein at least one of the grooves possesses a shape of a sickle which narrows in width towards one end of the groove.

10. The sealing element as claimed in claim 1, wherein one of the grooves is made extending in a segment of the sealing section and has a peripheral angle of less than or equal to 120°.

11. The sealing element as claimed in claim 1, wherein at least one of the grooves possessing a width that increases to an axial side to which fluid return is permitted.

12. The sealing element as claimed in claim 1, wherein at least one of the grooves terminates as a ramp into the region which is peripherally closed in itself.

13. The sealing element as claimed in claim 1, wherein the grooves exist between crosspieces that contact the shaft, the crosspieces are located in the sealing region in a circular cylinder.

14. The sealing element as claimed in claim 1, wherein the sealing section which adjoins the shaft is a hollow cylinder.

15. The sealing element as claimed in claim 1, wherein the sealing element is a radial shaft gasket.

16. The sealing element as claimed in claim 1 wherein the radial thickness of the one region of the sealing section which is peripherally closed in itself is 0.4 mm to 0.55 mm.

17. The sealing element as claimed in claim 16 wherein at least one of the grooves possesses a shape of a sickle which narrows in width towards one end of the groove.

18. The sealing element as claimed in claim 1, wherein the first elastomer material is one of AEM (ethylene-acrylic elastomer), ACM ((poly)acrylate/acrylic elastomer), EVM (ethylene vinyl acetate copolymer) or silicone.

* * * * *